United States Patent
Mandai et al.

(10) Patent No.: US 6,582,768 B2
(45) Date of Patent: Jun. 24, 2003

(54) EXTRUSION-TYPE COATING METHOD AND APPARATUS

(75) Inventors: Toshihiro Mandai, Odawara (JP); Norio Shibata, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/901,660

(22) Filed: Jul. 11, 2001

(65) Prior Publication Data

US 2002/0023584 A1 Feb. 28, 2002

(30) Foreign Application Priority Data

Jul. 11, 2000 (JP) ......................................... 2000-209565

(51) Int. Cl.[7] ................................................. B05D 3/12
(52) U.S. Cl. ....................... 427/356; 118/410; 118/411; 118/712; 427/358; 427/131
(58) Field of Search ................... 118/410, 411, 118/712, 419; 427/356, 358, 131; 425/466

(56) References Cited

U.S. PATENT DOCUMENTS

| | | | |
|---|---|---|---|
| 5,425,967 A | * | 6/1995 | Tomaru |
| 5,547,510 A | * | 8/1996 | Aizawa et al. |
| 5,624,497 A | * | 4/1997 | Tanaka et al. |

FOREIGN PATENT DOCUMENTS

| | | | |
|---|---|---|---|
| JP | 60-238179 | 11/1985 | ............. B05C/5/02 |
| JP | 62-132566 | 6/1987 | ............. B05D/1/26 |
| JP | 4-145977 | 5/1992 | ............. B05C/5/02 |
| JP | 6-296917 | 10/1994 | ............. B05C/5/02 |
| JP | 11-314065 | 11/1999 | ............. B05D/1/26 |

* cited by examiner

Primary Examiner—Brenda A. Lamb
(74) Attorney, Agent, or Firm—Sughrue Mion, PLLC

(57) ABSTRACT

Edge faces with level differences are formed by assembling blocks constructing a coating head, and level difference variances in the width direction of a web are measured by a level difference variance measurement device. Then, the level difference variances are adjusted with reference to measured results, so that the level difference variances can be reduced. Therefore, coating layers can be uniformly formed on the web.

14 Claims, 12 Drawing Sheets

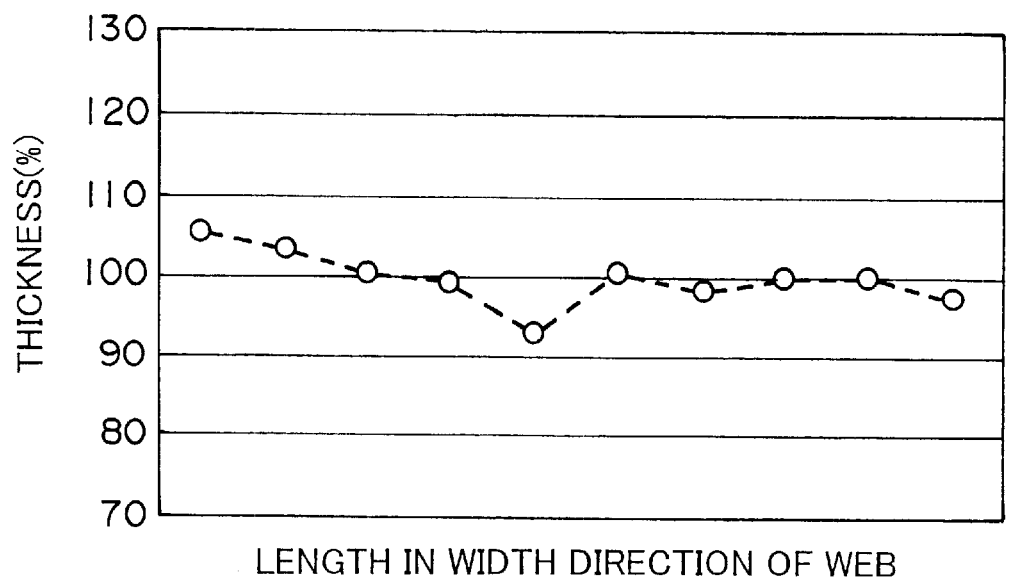
F I G. 1 2 (a)
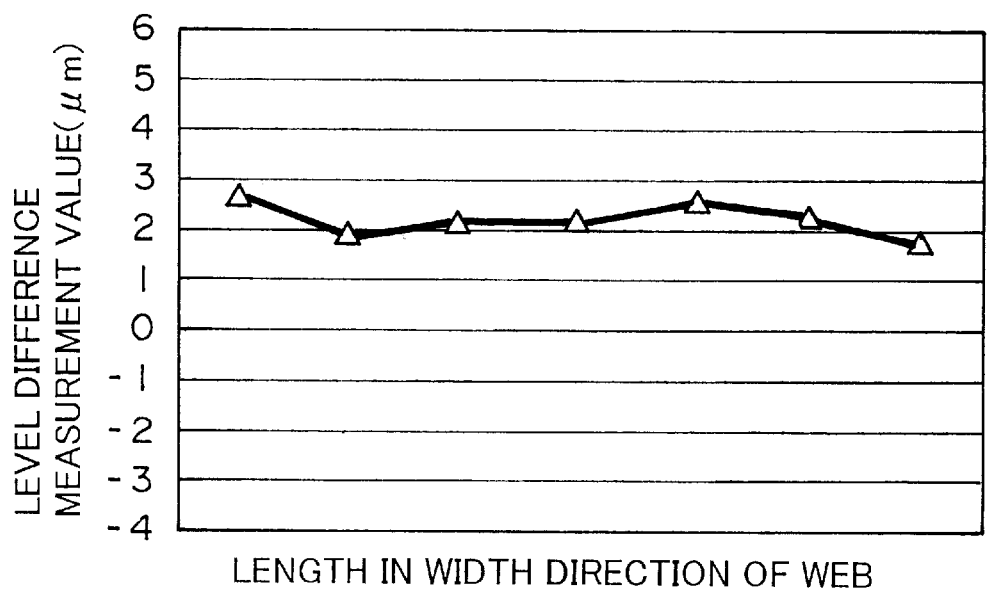
F I G. 1 2 (b)

EXTRUSION-TYPE COATING METHOD AND APPARATUS

BACKGROUND OF THE INVENTION

1. Field of the Invention

The present invention relates to an extrusion-type coating method and coating apparatus, particularly to an extrusion-type coating method and coating apparatus for coating a web with coating liquids to form thin and uniform magnetic recording layers in order to produce a magnetic storage medium with a high capacity and a high density.

2. Description of the Related Art

In order to produce a magnetic storage medium with a high capacity and a high density, a thin and uniform magnetic recording layer needs to be formed on a web. In an extrusion-type coating apparatus, the continuously-running web is relatively pressed against edge faces of a coating head, and one or more coating liquids supplied into the coating head are supplied to discharge mouths of the coating head through supply routes and discharged from the discharge mouths of the coating head formed in the width direction of the web, so as to coat the web with the coating liquids. Moreover, an extrusion-type coating method is performed by which plural coating layers having a first layer (bottom layer) as a non-magnetic layer and a second layer (top layer) as a magnetic layer are simultaneously formed, and an extremely thin magnetic recording layer is thus obtained.

In such extrusion-type coating method, a coating defect may occur such as an unevenness of a thickness of the magnetic recording layer in the width direction of the web if the web is coated unevenly in the width direction of the web. The higher the density of the magnetic recording layer is, the higher the required precision of the uniformity is.

In a conventional art, improvements in a form of the edge face, a tension condition of the web, and further a positional relationship of each of the edge faces with respect to the web surface, are attempted in or to attain the uniformity of the magnetic recording layer. Some of such prior arts are Japanese Patent Application Laid-open Nos. 60-238179, 62-132566, and 4-145977, in which discussions are described on properly setting a thickness of a back blade, on properly setting an entering angle of the web into the coating head and on adjusting a space between a trailing end of the edge face and the web. Further, Japanese Patent Application Laid-open No. 6-296917 teaches that a coating head which can be divided into plural blocks for each of the edge faces and a level difference is formed on each of the edge faces by sliding each block, whereby the positional relationship between the edge faces with respect to the web surface is appropriately set. Still further, Japanese Patent Application Laid-open No. 11-314065 teaches that a length of the perpendicular is adjusted in the width direction of a web, in which a leading end on an edge face of a block at the trailing end becomes A, and a trailing end on the edge face of the block at the leading end becomes B, the perpendicular being connected with a tangent line, that is written on the edge face of the block at the trailing end from the trailing end B on the edge face of the block at the leading end by passing a supply route.

When assembling a coating head in a method for setting level differences of the edge faces by using the coating head which can be divided into plural blocks for each of the edge faces mentioned above, each block is processed beforehand in a size with a height suitable for a level difference so that the level difference has a desired height, then the blocks are assembled and fastened while being placed on a reference plane. In another method, the heights as well as sizes of the blocks are measured beforehand when assembling the coating head, and the heights of the blocks are adjusted by laying a spacer at the bottom of each block and the blocks are fastened in that state. In short, the level differences of the edge faces are set by referring to manufacturing precision and flatness as a reference of the blocks.

However, when setting the level difference by the above-described method, a magnetic recording layer which is satisfactory uniform cannot be obtained if the manufacturing precision of the blocks is low, because the precision of the levels is determined by results of the manufacturing precision of the blocks. In a case where the width of the web is wide such as 1 meter or more, a technology for manufacturing the blocks with precision of a few micrometers is extremely cost-consuming as well as difficult.

SUMMARY OF THE INVENTION

The present invention has been developed in view of the above-described circumstances, and has as its object the provision of an extrusion-type coating method and apparatus in which level difference of edge faces can be precisely set to form a uniform layer, and unnecessarily-high manufacturing precision of the blocks is not needed to avoid an increase of costs for block manufacturing.

In order to achieve the above-described objects, the present invention provides an extrusion-type coating method wherein a continuously-running web is relatively pressed against edge faces of a coating head, a coating liquid supplied into the coating head is supplied to a discharge mouth formed on the edge faces in a direction of a width of the web through a supply route and is discharged from the discharge mouth so as to apply the coating liquid on the web, and the coating head is divided into two blocks along the supply route so that a level difference between the edge faces can be set, the extrusion-type coating method comprising the steps of: preliminarily setting the level difference by assembling the blocks on a base with a reference plane so that the level difference between the edge faces is a desired level difference; then measuring a variance of the level difference preliminarily set in the width direction of the web; then finally setting the level difference according to results of the measurement; and then applying the coating liquid on the web by using the coating head into which the set blocks are assembled.

Further, in order to achieve the above-described objects, the present invention provides an extrusion-type coating apparatus wherein a continuously-running web is relatively pressed against edge faces of a coating head, a coating liquid supplied into the coating head is supplied to a discharge mouth formed on the edge faces in a direction of a width of the web through a supply route and is discharged from the discharge mouth so as to apply the coating liquid on the web, and the coating head is divided into two blocks along the supply route so that a level difference between the edge faces can be set, the extrusion-type coating apparatus comprising: a level difference variance measurement device which measures a variance of the level difference in the width direction of the web; and a level difference correction device which corrects the level difference according to results of the measurement by the level difference variance measurement device so that the variance of the level difference is reduced.

Accordingly, the extrusion-type coating method and apparatus of the present invention first forms the edge faces with the level difference by assembling the blocks constructing the coating head, and measures the variance of the level difference in the width direction of the web by the level difference variance measurement device, then adjusts the level difference to eliminate the variance with reference to the measured results. Thus, a uniform coating layer can be formed on the web. Furthermore, the coating layer can be still thinner because the coating layer can be uniform.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 12(a) and 12(b) are views illustrating measured values of the level difference variance measurement and thickness variance of the coating layer in Example 2.

DETAILED DESCRIPTION OF THE PREFERRED EMBODIMENTS

Hereunder preferred embodiments of the present invention will be described in detail in accordance with the accompanying drawings.

Figure 1:
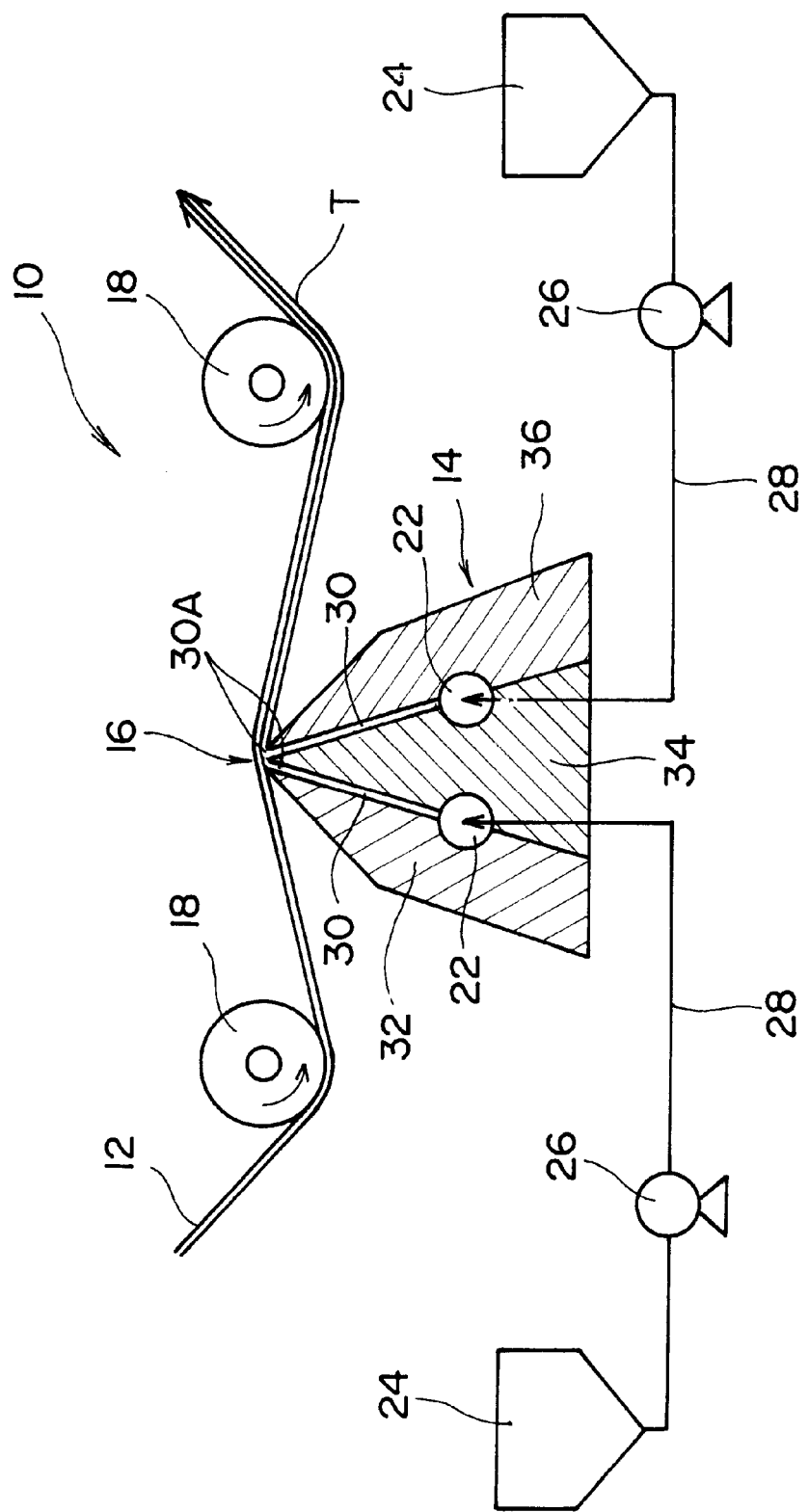
FIG. 1 is a view showing an entire structure of an extrusion-type coating head.

FIG. 1 is a view showing an entire structure of an extrusion-type coating apparatus 10.

The coating apparatus 10 for coating a continuously running web 12 comprises a coating head 14 for applying coating liquids on the web 12, a pair of guide rollers 18, which are provided on both sides of the coating head 14 to press the web 12 against an edge face 16 of the coating head 14, and a level difference variance measurement device 20 (see FIGS. 2, 3 and 8) for measuring variance of the level difference on the edge face 16 in the width direction of the web 12. The present embodiment will be described for a case with the coating head 14 which simultaneously applies two types of coating liquids on the web 12 to form two layers. In the case of the present embodiment, both coating liquids may be magnetic coating liquids, and the coating liquid for the bottom layer may be non-magnetic.

In the coating head 14, two cylindrical pockets 22 are formed in parallel with the width direction of the web 12. Each of the pockets 22 is connected with each of coating liquid tanks 24 for reserving the two types of coating liquids through each of liquid supply pumps 26 which supply coating liquids by a constant amount. Thereby, the coating liquids are supplied from the coating liquid tanks 24 to the pockets 22 and are so widened as to have a width corresponding with a coating width. The two types of coating liquids being widened at the respective pockets 22 go up through the respective supply routes 30, and are discharged from discharge mouths 30A formed on the edge face 16. The discharge mouths 30A are arranged next to the other in parallel with the width direction of the web 12, whereby the two types of coating liquids are simultaneously applied on the web 12 so as to form a coating layer T with two layers.

Figure 2:
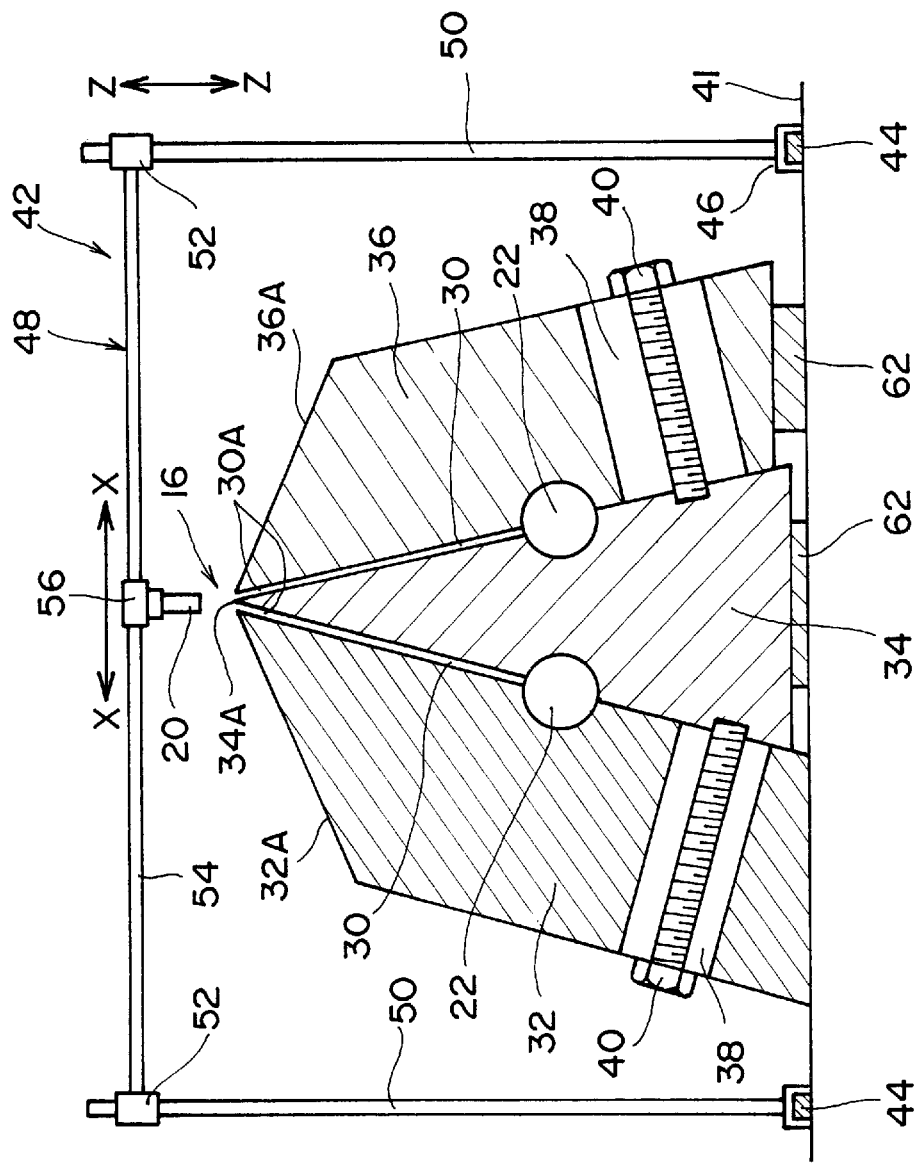
FIG. 2 is a view illustrating a moving mechanism of the coating head and a level difference variance measurement device.
Figure 3:
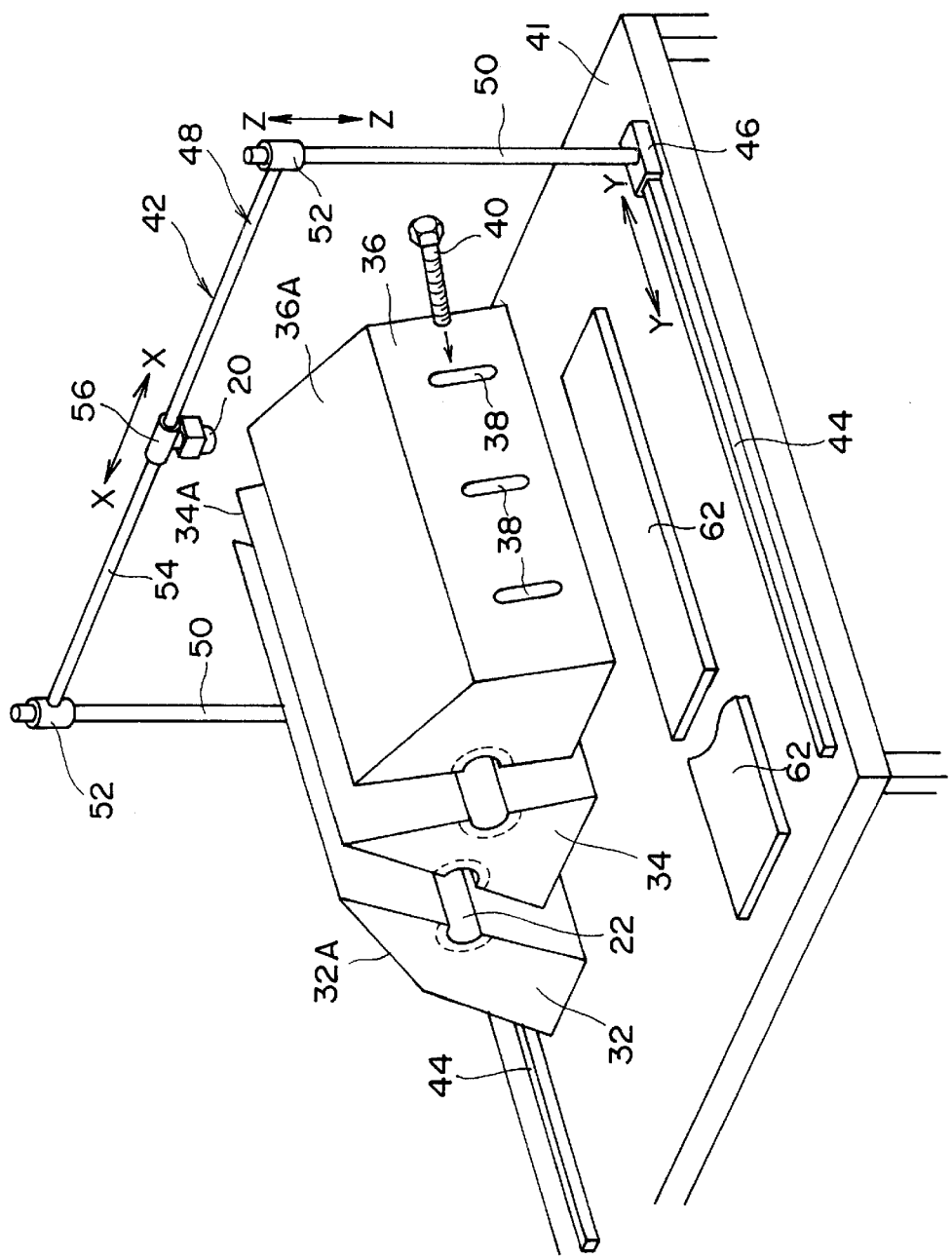
FIG. 3 is a view illustrating a structure of the coating head and the moving mechanism of the level difference variance measurement device.

As seen from FIGS. 2 and 3, the coating head 14 is formed to have a structure assembled with three blocks which can be divided at the supply routes 30. The coating head 14 comprises, naming from the leading end in the running direction of the web 12, a block 32 at the leading end, a middle block 34, and a block 36 at the trailing end. At each end of the blocks 32, 34, and 36, a front edge face 32A, a doctor edge face 34A for a first layer, and a doctor edge face 36A for a second layer are formed, respectively. The front edge face 32A has a length (a length in the running direction of the web) between 0.1 mm and 30 mm, and may be formed like a flat face or an arched face with a certain curvature. Each of the doctor edge faces 34A and 36A for the first layer and the second layer, respectively, has a length (the length in the running direction of the web) between 0.5 mm and 20 mm, and may be formed like a flat face or an arched face with a certain curvature, or even a combination of the flat and arched shape. The curvature can be appropriately changed depending on a running speed of the web 12, rigidity of the web 12, and thickness of the coating layer T to be formed on the web 12; and the curvature is preferably between R0.5 and R20.

The coating head 14 is now assembled to be integral by fastening the block 32 at the leading end and the middle block 34, and the middle block 34 and the block 36 at the trailing end with bolts 40 through fastening holes 38. Only one of the bolts 40 is shown in FIG. 3. In this structure of the coating head 14 assembled by the above-described manner, the block 32 at the leading end and the middle block 34, and the middle block 34 and the block 36 at the trailing end can slide on each other over a matching face of the blocks. Thus, in the coating head 14, level differences are formed among the edge faces 32A, 34A, and 36A of the blocks 32, 34, and 36, so that the relative heights of the edge faces 32A, 34A, and 36A with respect to the web 12 can be appropriately set when pressing the web 12 against the edge face 16. As seen from FIG. 3, the assembly for setting the levels of the blocks 32, 34, and 36 is performed on a base 41 with a reference plane.

The level difference variance measurement device 20 measures level variance of the level differences among the edge faces 32A, 34A, and 36A in the width direction of the web. The level difference variance measurement device 20 may be an optical microscope 20A (refer to FIG. 4) which focus-optically measures the level difference, a lever type dial gauge 20B (refer to FIG. 5) which measures the level difference by contacting a contact element 20b with the levels, a laser displacement detector 20C (refer to FIG. 6) which measures the level difference by a laser, and so forth. The level difference variance measurement device 20 is supported at a mobile mechanism 42 in a gatepost shape which is placed on the base 41.

As seen from FIGS. 2 and 3, the mobile mechanism 42 of a gatepost shape is constructed in which a gatepost member 48 is movably supported by a pair of parallel rails 44 and 44 which are laid on the base 41 in a direction of a Y axis, via linear bearings 46 and 46. An X axis rod 54 is stretched to a pair of columns 50 of the gatepost member 48 via first sliding members 52, and the level difference variance measurement device 20 is supported by the X axis rod 54 via a second sliding member 56. In this structure, the level difference variance measurement device 20 can move in the direction of the X and Y axes on a plane parallel with the reference plane of the base 41, and at the same time can move also in a Z axis direction which is perpendicular to the reference plane.

Figure 4:
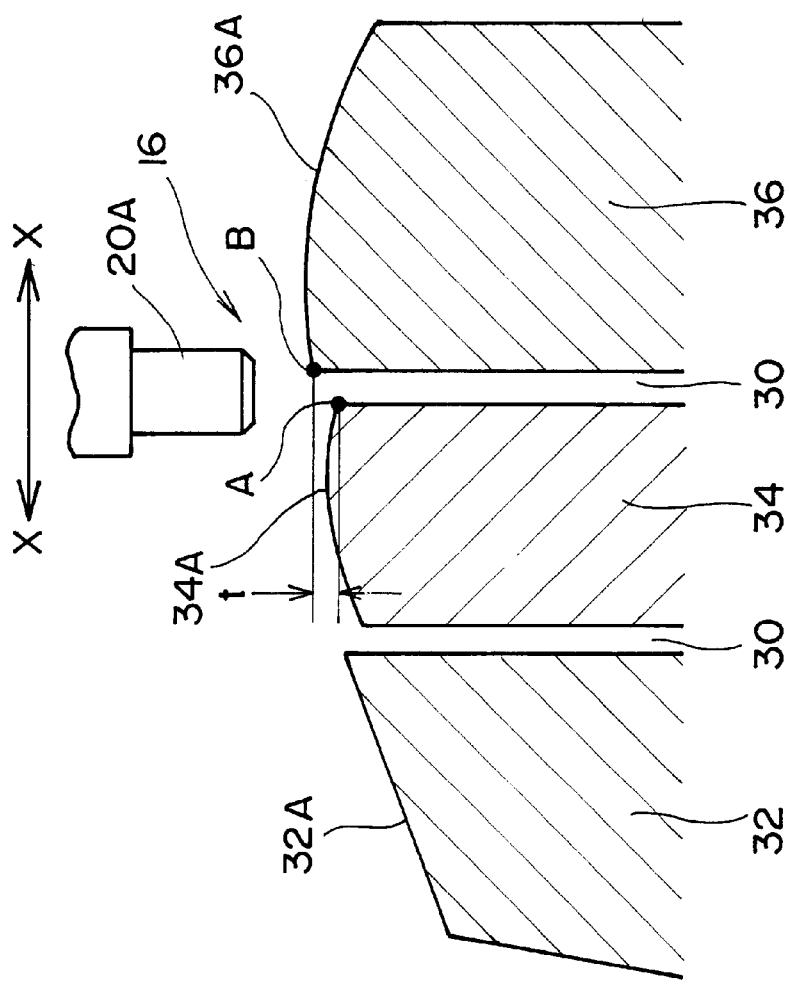
FIG. 4 is an explanatory view of a case where an optical microscope is used as the level difference variance measurement device.

FIG. 4 shows a level difference variance measurement by using the optical microscope 20A, in which the heights of the blocks 32, 34, and 36 are adjusted so that the heights have a desired level difference t on the base 41 in order to assemble the coating head 14, and also the coating head 14 is arranged so that the discharge mouth 30A corresponds with the direction of the Y axis of the base 41. In that state, the optical microscope 20A seeks a position at which a trailing end A of the doctor edge face 34A of the first layer is focused. At the next step, the optical microscope 20A is moved in the direction of the X axis up to a position at which a leading end B of the doctor edge face 36A of the second layer is focused, with respect to the last position (at which the trailing end A of the doctor edge face 34A of the first layer is focused) as the reference point, then the microscope 20A measures a level difference, which is a difference between a focal length at the A point and a focal length at the B point. After that, the above-described operations are repeated while moving the optical microscope 20A in the direction of the Y axis, whereby the level variance in the width direction of the web is measured. The same procedure applies to measurement of the level difference variance between the front edge face 32A and the doctor edge face 34A for the first layer.

Figure 5:
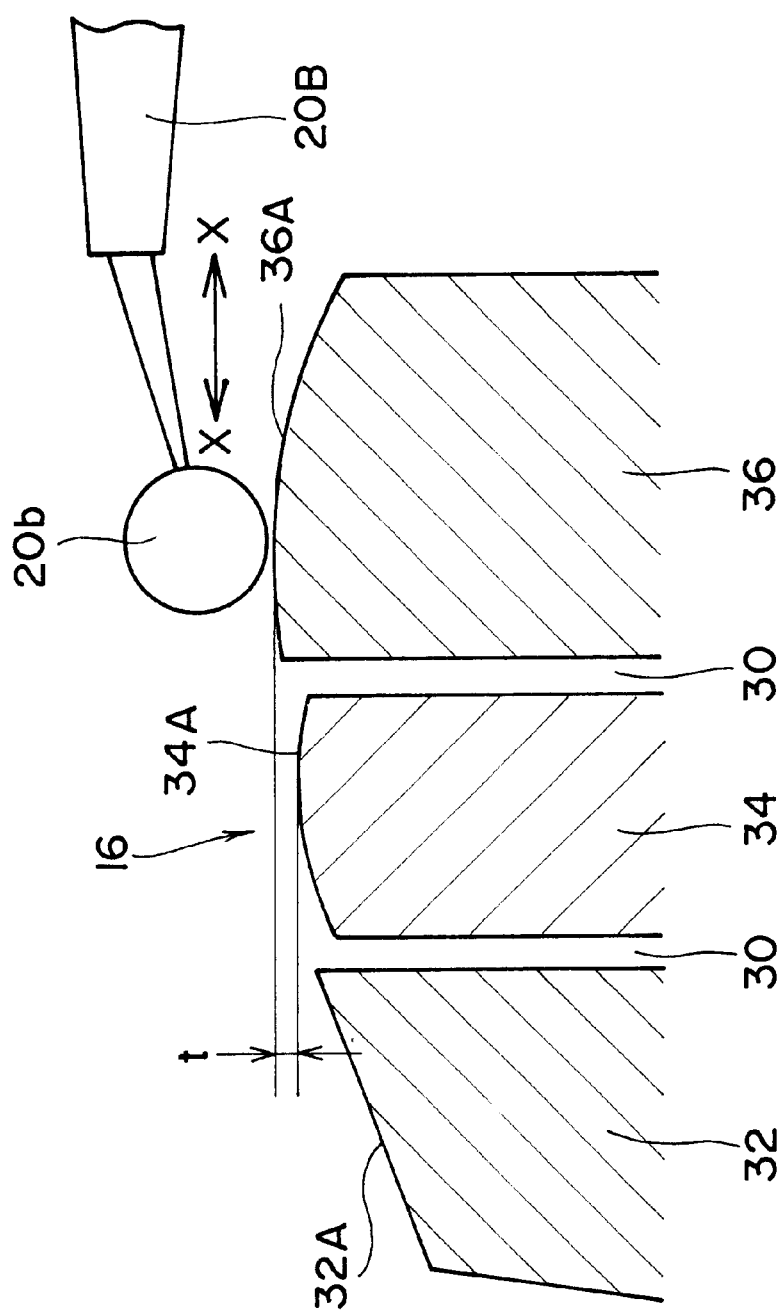
FIG. 5 is another explanatory view of a case where a lever type dial gauge is used as the level difference variance measurement device.

FIG. 5 shows level difference variance measurement by using the lever type dial gauge 20B which is used in the same manner with a case of the optical microscope 20A in terms of assembly of the coating head 14 on the base 41 and making the discharge mouth 30A corresponding with the direction of the Y axis of the base 41. In that state, the contact element 20b of the lever type dial gauge 20B is moved from the doctor edge face 34A for the first layer to the doctor edge face 36A for the second layer in the direction of the X axis of the base 41, and the lever type dial gauge 20B measures a displacement as a level difference between the peak of the doctor edge face 34A for the first layer and the peak of the doctor edge face 36A for the second layer. Then, the same operation is repeated while moving the lever type dial gauge 20B in the direction of the Y axis, whereby the level variance in the width direction of the web is measured. The same procedure applies to measurement of the level difference variance between the front edge face 32A and the doctor edge face 34A for the first layer.

Figure 6:
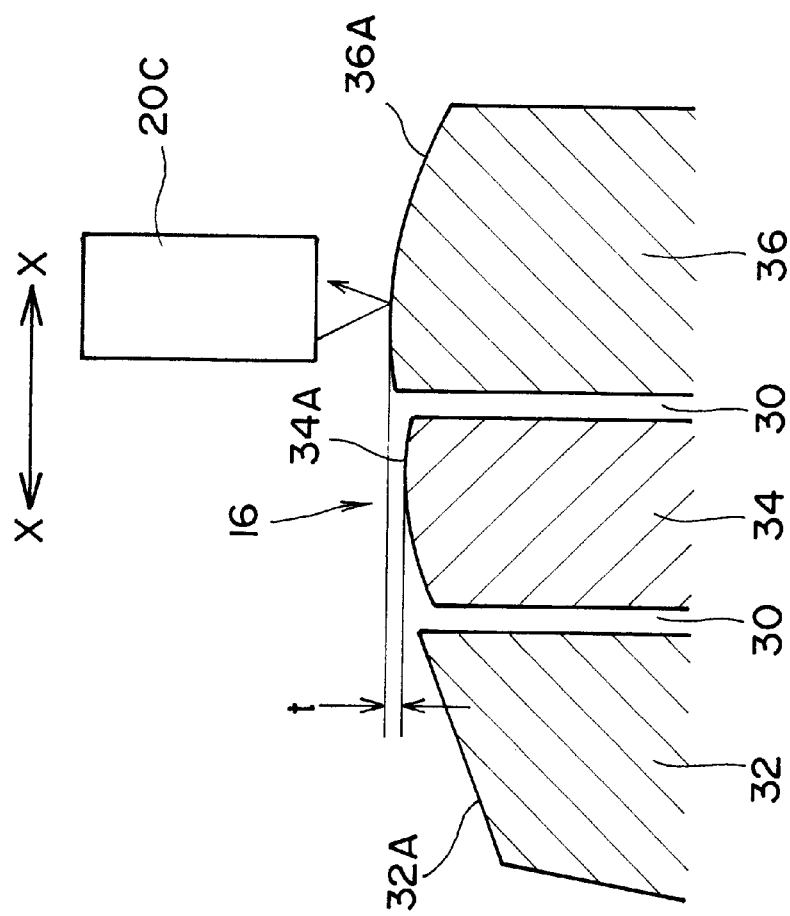
FIG. 6 is still another explanatory view of a case where a laser displacement detector is used as the level difference variance measurement device.

FIG. 6 shows measurement of level difference variance by using the laser displacement detector 20C which is used in the same manner as with the case of the optical microscope 20A and the lever type dial gauge 20B in terms of assembly of the coating head 14 on the base 41 and making the discharge mouth 30A corresponding with the direction of the Y axis of the base 41. In that state, the laser displacement detector 20C is moved from the doctor edge face 34A for the first layer to the doctor edge face 36A for the second layer in the direction of the X axis, and the laser displacement detector 20C measures a displacement as a level difference between the peak of the doctor edge face 34A for the first layer and the doctor edge face 36A for the second layer. After that, the same operation is repeated while moving the laser displacement detector 20C in the direction of the Y axis, whereby the level difference variance in the width direction of the web is measured. The same procedure again applies to measurement of the front edge face 32A and the doctor edge face 34A for the first layer.

Figure 7:
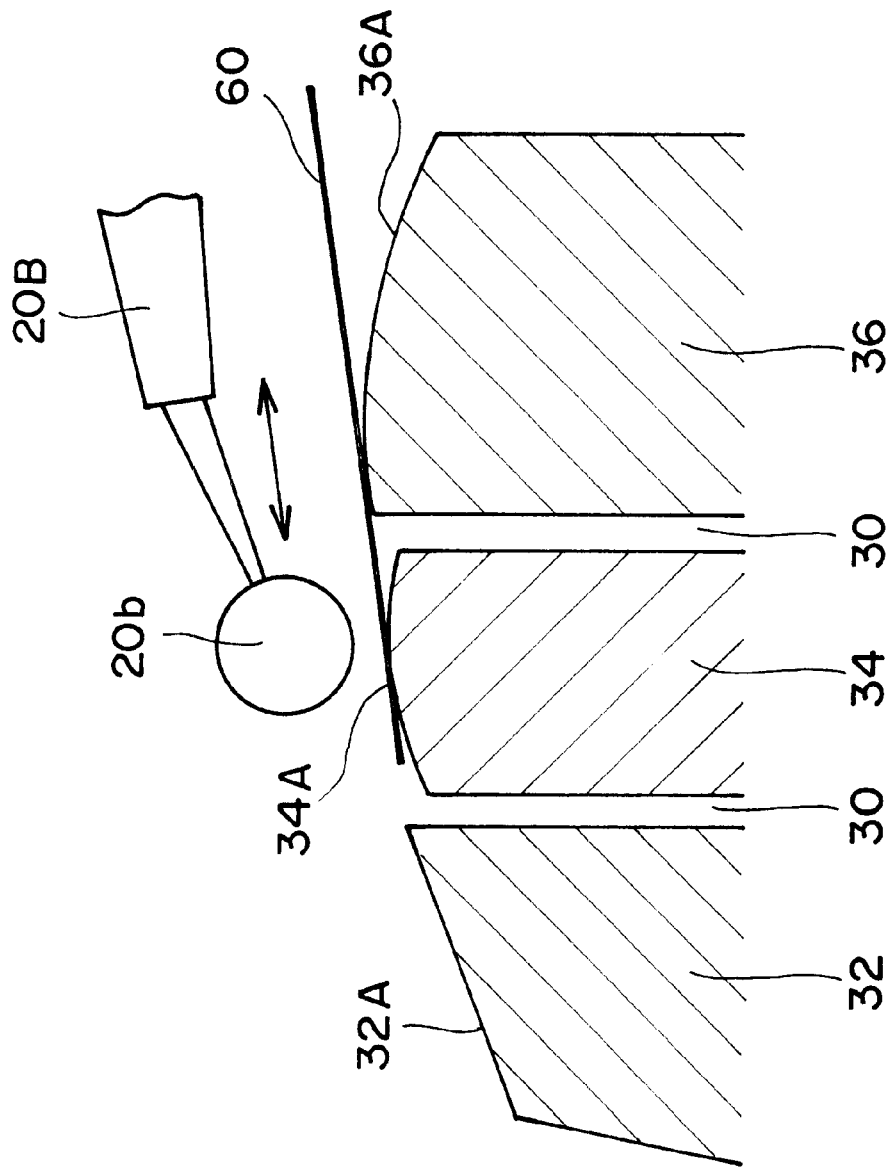
FIG. 7 is a view illustrating an alternative example of a moving method of the level difference variance measurement device.

FIG. 7 is an alternative example of the movement of the level difference variance measurement device 20 which is presented in the example with the lever type dial gauge 20B. This is a case where the contact element 20b moves in a direction of a tangent line 60 of the adjacent edge faces 34A and 36A, and the lever type dial gauge 20B in this case moves by using the directions of X axis and Z axis of the mobile mechanism 42.

Figure 8:
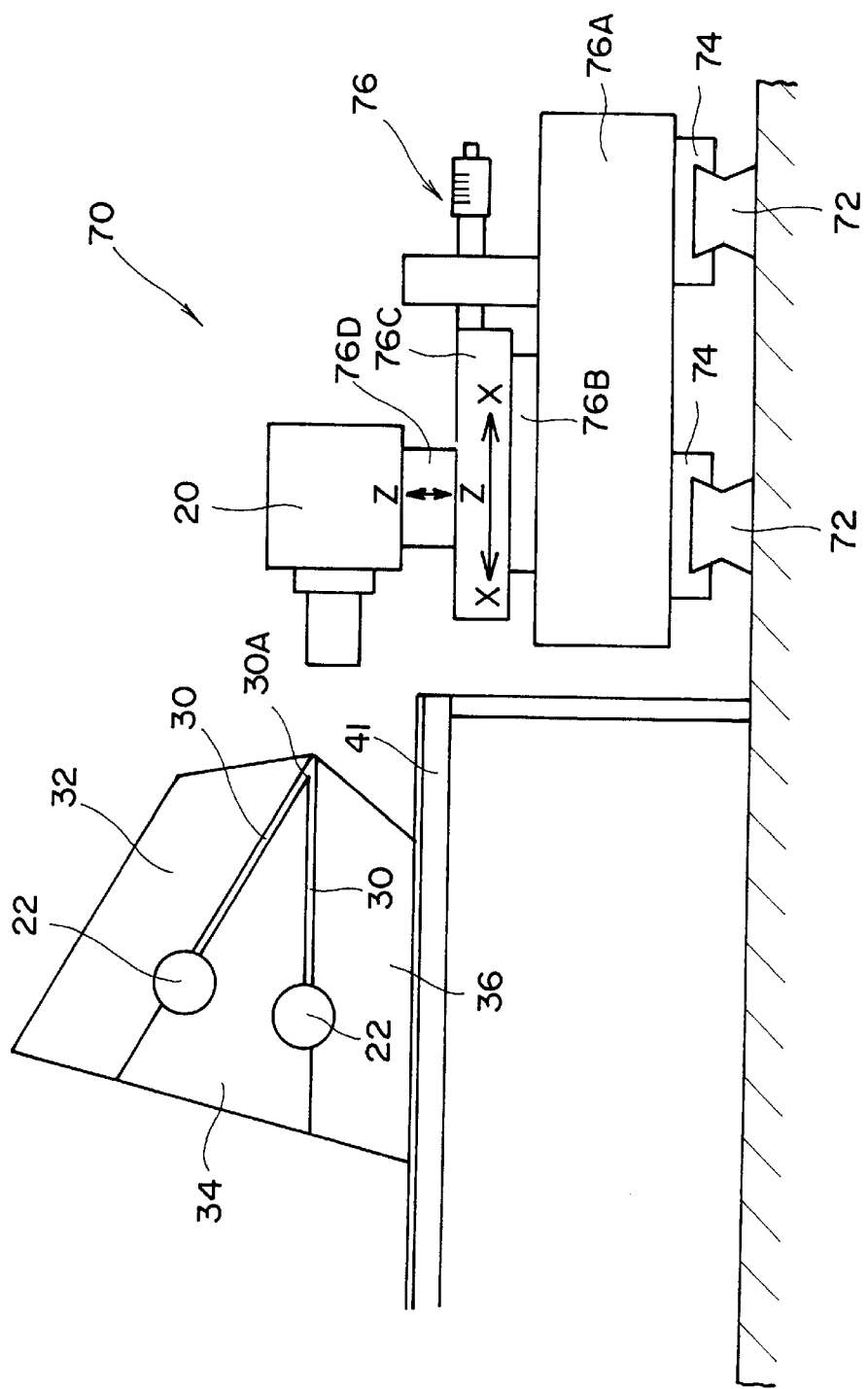
FIG. 8 is a view illustrating an alternative moving mechanism for the level difference variance measurement device.

FIG. 8 is another embodiment which differs from that of the mobile mechanism 42 of the gatepost shape. This case uses a mobile mechanism 70 of a horizontal measurement type which measures the level difference variance of the levels among the edge faces 32A, 34A, and 36A in the width direction of the web while the coating head 14 is laid on the base 41. In this case, the discharge mouth 30A of the coating head 14 being laid is set to be parallel with the direction of the Y axis on the base 41.

As seen from FIG. 8, the mobile mechanism 70 of the horizontal measurement type is provided at the proximity of the base 41, and is constructed in a manner that an XYZ mobile mechanism 76, that is movable in the directions of Y, X, and Z axes is provided on a pair of parallel Y axis rails 72 laid on a base in the direction of the Y axis, which is parallel with the discharge mouth 30A, via linear bearings 74.

The XYZ mobile mechanism 76 is constructed with a Y axis mobile body 76A, which slides on the Y axis rails 72, an X axis mobile body 76C, which slides via the X axis rail 76B laid on the Y axis mobile body 76A, and a Z axis mobile body 76D, which is provided on the X axis mobile body 76C and moves in a vertical direction. The level difference variance measurement device 20 is supported to the Z axis mobile body 76D.

The mobile mechanism 70 of the horizontal measurement type which is constructed as described above is unlike the mobile mechanism 42 of the gatepost shape which moves the level difference variance measurement device 20 by hanging it on the rod; thus the mobile mechanism 70 is particularly useful in a case where bending of the rod is concerned due to overweight of the level difference variance measurement device 20, and the mobile mechanism 70 in such a case can perform an accurate as well as stable measurement.

A coating method will be described for applying a coating liquid on the web 12 by using the extrusion-type coating apparatus 10 which is constructed as described above.

The coating head 14 with desired levels is assembled before starting coating operation.

As seen from FIG. 3, first, the blocks 32, 34, and 36 are placed on the base 41 with the reference plane and matching faces of the blocks 32, 34, and 36 are matched. At that time, if each of the blocks is processed to have a height which forms a target level difference t, and also if the level difference between the front edge face 32A and the doctor edge face 34A for the first layer, and between the doctor edge face 34A for the first layer and the doctor edge face 36A for the second layer have the target level difference t, the level difference is preliminarily set by loosely fastening the bolt 40 in that state. However, if the level difference between the front edge face 32A and the doctor edge face 34A for the first layer, and between the doctor edge face 34A for the first layer and the doctor edge 36A for the second layer do not have the target level difference, the level difference is preliminarily set by providing a level difference spacer 62 in between the bottom of the blocks and the base 41 so that the level difference between the edge face 32A, 34A, and 36A have the desired level difference.

Figure 9:
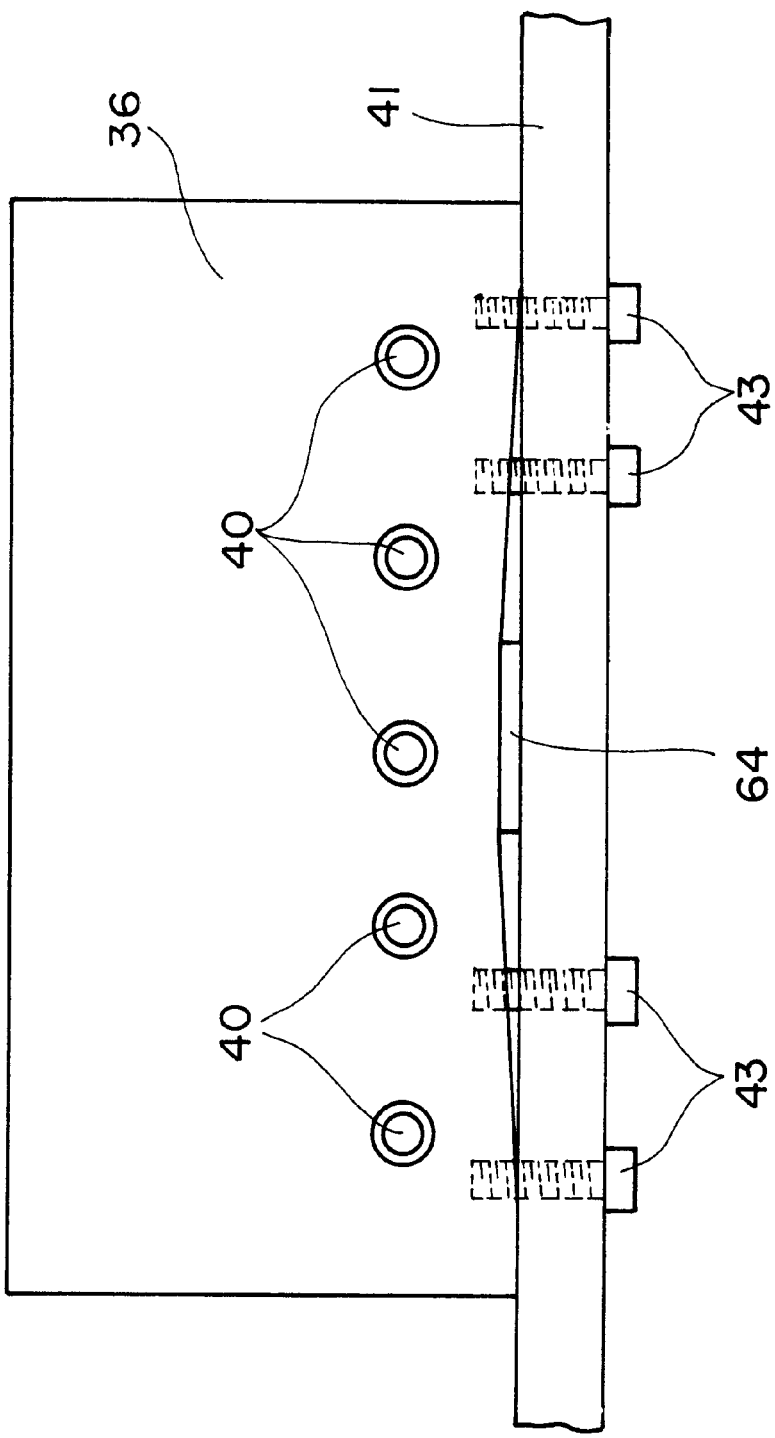
FIG. 9 is a view illustrating a method for formally setting the level differences.

Next, the level difference variance measurement device 20 measures the level difference variance of the preliminarily set level difference t in the width direction of the web, and adjusts the level difference variance with reference to a measured result. As to a method for adjusting the level difference variance, if a part of the block 36 in the width direction of the web is larger than the target level difference, one example can be given as shown in FIG. 9 in which a shim 64 is positioned between a part of the bottom face of the block 36 where the level difference should be corrected and the base 41, and the block 36 is fastened with screws 43 and is bent, whereby the level difference variance is corrected. In this method, the screws 43 between the block 36 and the base 41 should be fastened at both sides of the adjusting shim 64, hence the variance is difficult to correct at both ends of the block 36. In order to cope with this problem, first, the level difference of both ends of the block 36 is adjusted, and only the bolt 40 at both ends is fastened and fixed at that time, and then the correction of the variance should be performed orderly toward the inside. A final setting of the level difference is performed by fastening the blocks 32, 34, and 36 with all the bolts 40 so as to make the blocks one body in a state where all adjustments have been performed in the width direction of the web. The level difference measurements are naturally performed after the final setting, and a correction is performed again if the level difference at the target precision cannot be obtained.

After assembling the coating head 14 having the target level difference, the coating head 14 is set at a coating line, and a coating operation starts.

The level difference formed on the edge faces can thereby be set at a high degree of precision; hence the coating layer T can be formed with a uniform thickness on the web surface. Moreover, the coating layer T can be uniform, so the thickness of the coating layer T can be reduced. Further, since the level difference variance measurement device 20 measures the coating variance and the coating variance is adjusted with reference to the measured result, the processing precision of the blocks 32, 34, and 36 does not have to be unnecessarily high. Therefore, the cost for processing the blocks does not have to be increased.

In addition, the web can be a plastic film made of polyester such as polyethylene terephthalate, polyethylene naphthalate, polyolefin such as polypropylene, cellulosic such as cellulose triacetate and cellulose diacetate, vinyl resin such as polyvinyl chloride, polycarbonate, polyamide resin, or polysulfone resin; a metal sheet of aluminum or copper; a sheet of glass or ceramics, or the like. The web may be one which is pretreated by a corona discharge treatment, an undercoat treatment, a heat treatment, a metal deposition treatment, an alkalization treatment, and so forth.

EXAMPLE

Variance of the level difference and thickness variances of the coating layers in the width direction of the web were studied for a case where the coating liquids were applied on the web by using the above-described coating head. In Comparative Examples, variance of the level difference and thickness variances of the coating layers in the width direction of the web were studied for a case where the coating liquids were applied on the web by using a coating head which was assembled in a conventional manner without adjustment of the level difference by the coating variance measurement device.

Tables 1 and 2 show the compositions of the coating liquids to be applied on the web to form the top layer and the bottom layer, respectively. Each of the coating liquid was made by sufficiently mixing and dispersing the liquid in a ball mill, then adding epoxy resin of 30 parts by weight to the liquid.

TABLE 1

| | |
|---|---|
| Fe/Zn/Ni powder | 300 parts by weight |
| Vinyl chloride - vinyl acetate copolymer | 30 parts by weight |
| Conductive carbon | 20 parts by weight |
| Polyamide resin | 15 parts by weight |
| Lecithin | 6 parts by weight |
| Cyclohexane | 300 parts by weight |
| Methyl ethyl ketone | 300 parts by weight |
| N-butanol | 100 parts by weight |

TABLE 2

| | |
|---|---|
| $TiO_2$ Powder | 300 parts by weight |
| Vinyl chloride - vinyl acetate copolymer | 30 parts by weight |
| Conductive carbon | 20 parts by weight |
| Polyamide resin | 15 parts by weight |
| Lecithin | 6 parts by weight |
| Cyclohexane | 500 parts by weight |
| N-butanol | 100 parts by weight |

Other coating conditions were as presented below.
1) Web (PET film)
   thickness: 60 $\mu$m
   width: 1000 mm
2) Coating speed
   150 m/min.
3) Coating thickness (in wet state)
   top layer: 1.5 cc/m$^2$
   bottom layer: 7.0 cc/m$^2$
4) Formation of the coating head
   curvature of the doctor edge face for the bottom layer: 4 mm
   curvature of the doctor edge face for the top layer: 6 mm
   gap between blocks 32 and 34:0.15 mm
   gap between blocks 34 and 36:0.15 mm
Results are shown in FIGS. 10(a), 10(b), 11(a), 11(b), 12(a) and 12(b).

Figure 10:
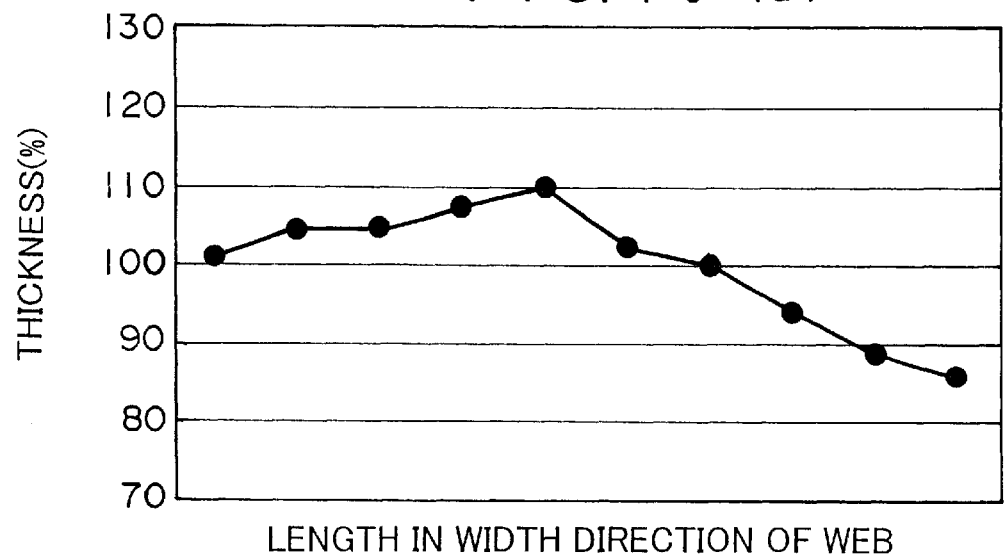
FIGS. 10(a) and 10(b) are views illustrating measured values of the level difference variance measurement and thickness variance of the coating layer in Comparative Example 1.
Figure 10:
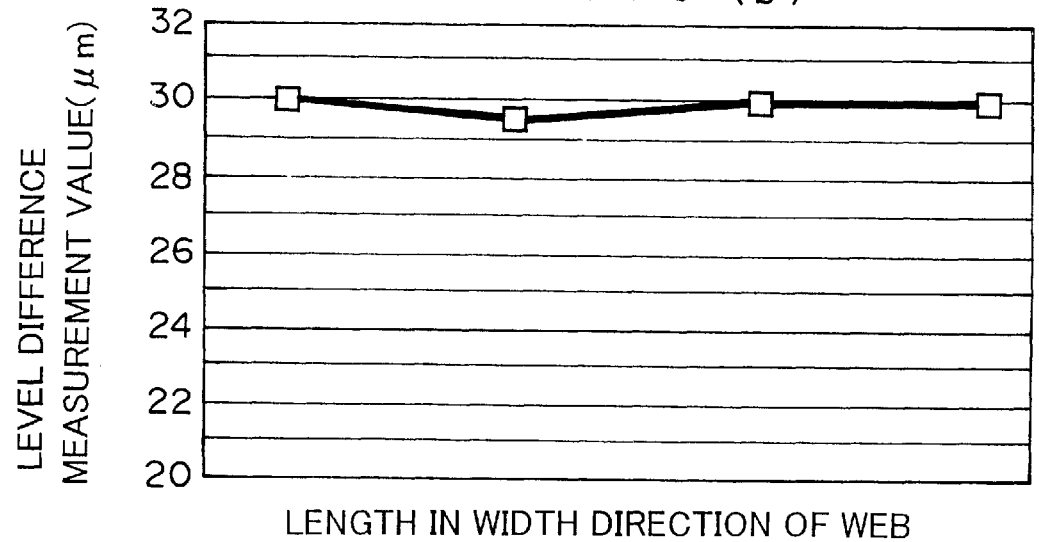

FIGS. 10(a) and 10(b) show Comparative Example in a conventional coating head assembled by using only a level difference spacer but not the level difference variance measurement device.

Figure 11:
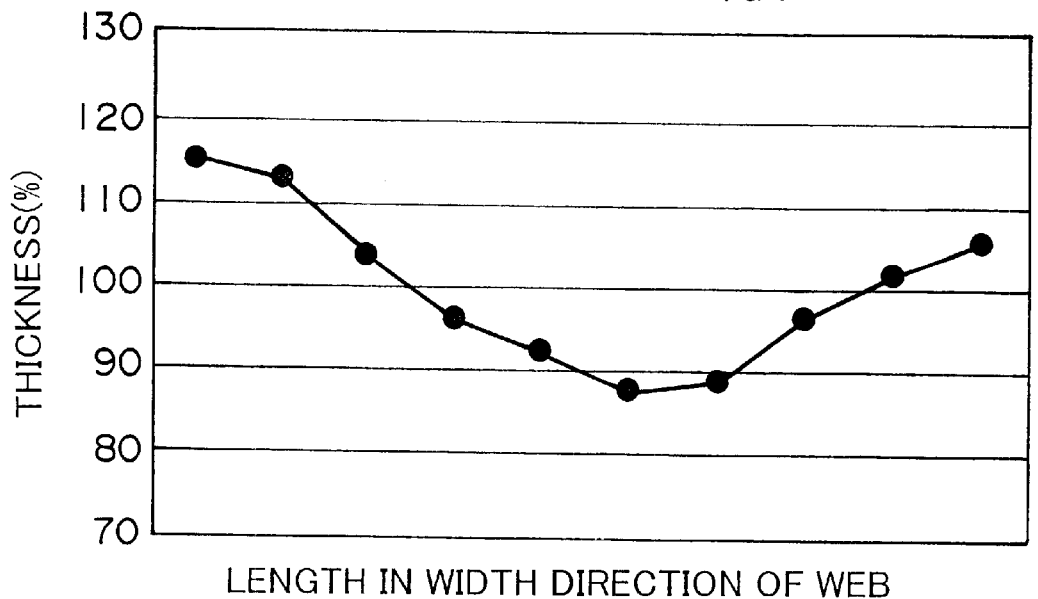
FIGS. 11(a) and 11(b) are views illustrating measured values of the level difference variance measurement and thickness variance of the coating layer in Example 1.
Figure 11:
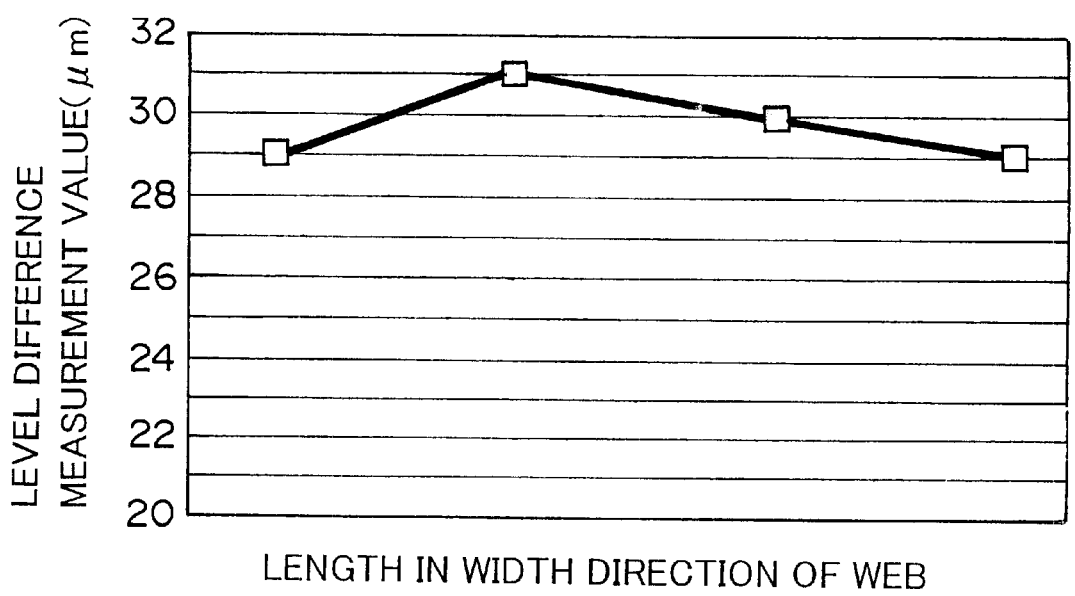

FIGS. 11(a) and 11(b) show Example 1 which used a coating head assembled according to the present invention where the optical microscope was used as the level difference variance measurement device for setting the level difference.

FIGS. 12(a) and 12(b) show Example 2 which used a coating head assembled according to the present invention where the lever type dial gauge was used as the level difference variance device for setting the level difference.

Note that the level difference measurement values in the width direction of the web shown in FIGS. 10(b), 11(b), and 12(b) are values which were measured by a laser displacement detector after setting the level difference by assembling the coating head.

In the comparative example in FIGS. 10(a) and 10(b), a maximum value and the minimum value in the level difference measurement were 31 μm and 29 μm, respectively, and thus the difference between the maximum and the minimum values was distributed by 2 μm. The thickness variance of the coating layer in the width direction of the web had a large variance of between 87% and 116% (i.e. variance by 29 points by percent) assuming that the standard thickness is 100%.

In contrast, in Example 1 shown in FIGS. 11(a) and 11(b), which used the optical microscope as the level difference variance measurement device for setting the level difference, the maximum value and the minimum value in the level difference measurement were 30 μm and 29.5 μm, respectively, and thus the difference between the maximum and the minimum values was distributed by 0.5 μm, which is a small value. The thickness variance of the coating layer in the width direction of the web varied between 87% and 110% (i.e. variance by 23 points by percent) assuming that the standard thickness is 100%. Thus, the thickness variance was somewhat improved compared with Comparative Example 1.

In Example 2 shown in FIGS. 12(a) and 12(b), which used the lever type dial gauge as the level difference variance measurement device for forming the level difference, substantially uniform level differences were able to be set without almost no level difference variance in the width direction of the web despite the fact that the set level difference was 2 μm, which was extremely small. The thickness variance of the coating layer in the width direction of the web was between 92% and 106% (i.e. variance by 14 points by percent) assuming that the standard thickness is 100%. Thus, the thickness variance was dramatically improved comparing with Comparative Example 1 and Example 1.

In view of the above-described results, Example 2, which used the lever type dial gauge rather than the optical microscope, had a high measurement precision and was able to set a uniform level difference, thus achieved a satisfactory result in terms of uniformity of the coating layer. This result appears to point out that the optical microscope causes a measurement error, because it has to measure the level difference of edges by focusing on each of the edges in order to obtain a mark for a focus point required for a measurement, and such edge often has a minute slack or crack. On the other hand, if the lever type dial gauge measures the level difference variance by taking the maximum points of the edge faces, such slack and crack do not often exist; hence the level difference variance can be measured at a high degree of precision.

As described hereinabove, since the extrusion-type coating method and the coating apparatus of the present invention can set the level differences of the edge faces at a high precision, a coating layer with a uniform thickness can be formed over the web surface. Moreover, the coating variance is measured by the coating variance measurement device in order to adjust the coating variance with reference to the measured results; thus the processing precision of the blocks composing the coating block does not have to be unnecessarily high, and the cost for block processing is not increased.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An extrusion coating method wherein a continuously-running web is relatively pressed against edge faces of a coating head, a coating liquid supplied into the coating head is supplied to a discharge mouth formed on the edge faces in a direction of a width of the web through a supply route and is discharged from the discharge mouth so as to apply the coating liquid on the web, and the coating head is divided into two blocks along the supply route so that a level difference between the edge faces can be set, the extrusion coating method comprising the steps of:

preliminarily setting the level difference by assembling the blocks on a base with a reference plane so that the level difference between the edge faces is a desired level difference;

then measuring a variance of the level difference preliminarily set in the width direction of the web using a level difference variance measuring device;

then finally setting the level difference according to results of the measurement using a level difference correction device; and then applying the coating liquid on the web by using the coating head into which the set blocks are assembled.

2. An extrusion coating method wherein a continuously-running web is relatively pressed against edge faces of a coating head, coating liquids supplied into the coating head are supplied to discharge mouths formed on the edge faces in a direction of a width of the web through supply routes and are discharged from the discharge mouths so as to apply the coating liquids on the web, and the coating head is divided into blocks along the supply routes so that level differences between the edge faces can be set, the extrusion coating method comprising the steps of:

preliminarily setting the level differences by assembling the blocks on a base with a reference plane so that the level differences between the edge faces are desired level differences;

then measuring variances of the level differences preliminarily set in the width direction of the web using a level difference variance measuring device;

then finally setting the level differences according to results of the measurement using a level difference correction measuring device; and then applying the coating liquid on the web by using the coating head into which the set blocks are assembled.

3. An extrusion coating apparatus wherein a continuously-running web is relatively pressed against edge faces of an extrusion coating head, a coating liquid supplied into the extrusion coating head is supplied to a discharge mouth formed on the edge faces in a direction of a width of the web through a supply route and is discharged from the discharge mouth so as to apply the coating liquid on the web, and the extrusion coating head is divided into two blocks along the supply route so that a level difference between the edge faces can be set, the extrusion coating apparatus comprising:

said extrusion coating head for extruding the coating liquid onto the web;

a level difference variance measurement device which measures a variance of the level difference in the width direction of the web; and a level difference correction device which corrects the level difference according to results of the measurement by the level difference variance measurement device so that the variance of the level difference is reduced.

4. The extrusion coating apparatus as defined in claim 3, wherein the level difference variance measurement device comprises an optical microscope which measures the level difference of the edge faces along the width direction of the web.

5. The extrusion coating apparatus as defined in claim 3, wherein the level difference variance measurement device comprises a contact level difference detector which measures the level difference of the edge faces along the width direction of the web with a contact in contact with the edge faces.

6. The extrusion coating apparatus as defined in claim 5, wherein the contact level detector comprises a lever dial gauge.

7. The extrusion coating apparatus as defined in claim 3, wherein the level difference variance measurement device comprises a laser displacement detector which measures the level difference of the edge faces along the width direction of the web with laser.

8. The extrusion coating apparatus as defined in claim 3, wherein the level difference variance measurement device moves along a tangent line which connects the edge faces while measuring the level difference.

9. An extrusion coating apparatus wherein a continuously-running web is relatively pressed against edge faces of an extrusion coating head, coating liquids supplied into the extrusion coating head are supplied to discharge mouths formed on the edge faces in a direction of a width of the web through supply routes and are discharged from the discharge mouths so as to apply the coating liquids on the web, and the extrusion coating head is divided into blocks along the supply routes so that level differences between the edge faces can be set, the extrusion coating apparatus comprising:

said extrusion coating head for extruding coating liquids onto the web;

a level difference variance measurement device which measures variances of the level differences in the width direction of the web; and a level difference correction device which corrects the level differences according to results of the measurement by the level difference variance measurement device so that the variances of the level difference are reduced.

10. The extrusion coating apparatus as defined in claim 9, wherein the level difference variance measurement device comprises an optical microscope which measures the level differences of the edge faces along the width direction of the web.

11. The extrusion coating apparatus as defined in claim 9, wherein the level difference variance measurement device comprises a contact level difference detector which measures the level differences of the edge faces along the width direction of the web with a contact in contact with the edge faces.

12. The extrusion coating apparatus as defined in claim 11, wherein the contact level detector comprises a lever dial gauge.

13. The extrusion coating apparatus as defined in claim 9, wherein the level difference variance measurement device comprises a laser displacement detector which measures the level differences of the edge faces along the width direction of the web with laser.

14. The extrusion coating apparatus as defined in claim 9, wherein the level difference variance measurement device moves along tangent lines which connect the edge faces while measuring the level differences.

* * * * *